ATTACHMENT FOR MOUNTING SHIELD ON SAFETY CAP

Filed May 25, 1965

INVENTORS
JACK N. SIMPSON &
WILLIAM R. BOHNER
BY William J. Ruano
ATTORNEY

United States Patent Office 3,332,086

Patented July 25, 1967

1

3,332,086

ATTACHMENT FOR MOUNTING SHIELD ON SAFETY CAP

Jack N. Simpson and William R. Bohner, Reading, Pa., assignors to The Electric Storage Battery Company, Philadelphia, Pa.

Filed May 25, 1965, Ser. No. 458,542

1 Claim. (Cl. 2—8)

This invention relates to a detachable welding shield (or face shield) and safety cap combination and, more particularly, to a detachable connection therebetween which enables the welder, by the use of even one hand, to either attach the welding shield or to detach it from the safety cap so that he may use his other hand for holding a welding electrode holder or other equipment. This invention is an improvement over that shown in Herbine et al. Patent 3,137,005, issued June 16, 1964, to the present assignee.

An outstanding disadvantage of the mounting shown in said patent is that it does not provide clearance to enable wearing of a respirator under the welding helmet, also it does not permit the welder to line up his vision with the sight shield or window of the helmet.

An object of the present invention is to provide a novel welding shield attachment for mounting the shield on a safety cap in a manner so as to overcome the above-named disadvantages and to permit sufficient clearance for a respirator to be worn under the welding helmet, also to permit vertical and angular adjustment of the shield to permit lining up of the window thereof with the wearer's eyes.

Other objects and advantages will become more apparent from a study of the following description taken with the accompanying drawing wherein.

Figure 1:
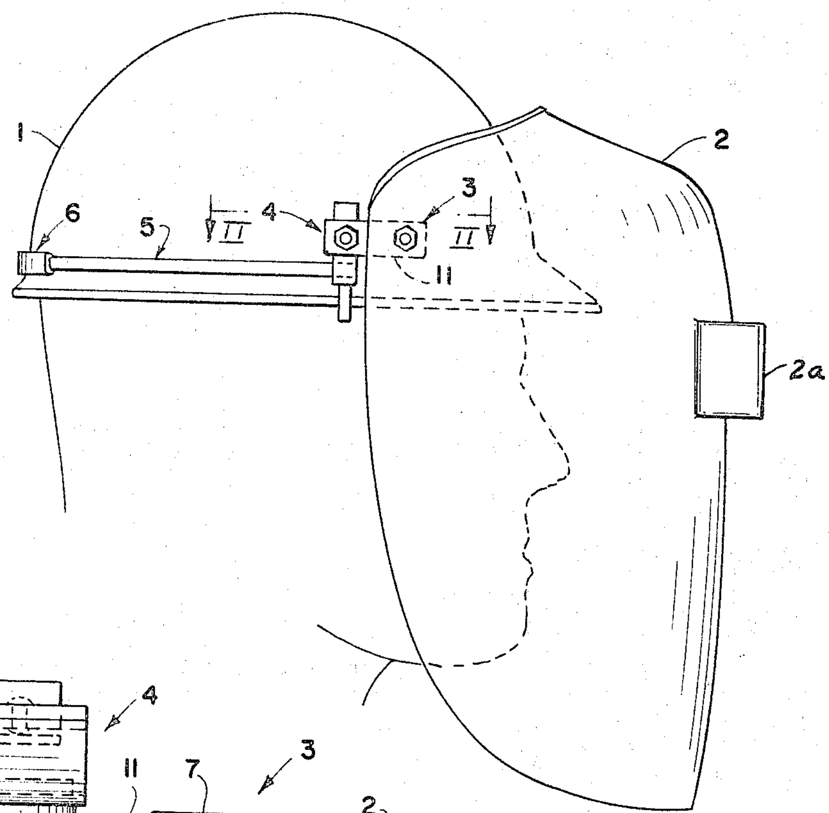
FIG. 1 is a side view of a welding shield including a mounting for easy attachment on a safety cap and embodying the principles of the present invention.
Figure 2:
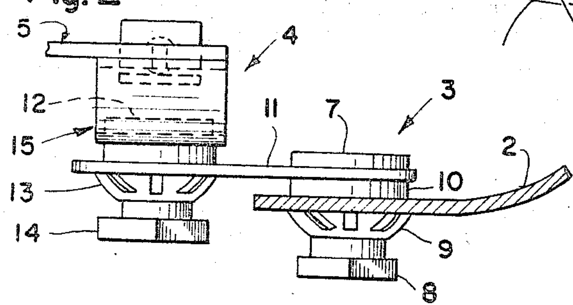
FIG. 2 is an enlarged, fragmentary view taken along line II—II of FIG. 1.
Figure 3:
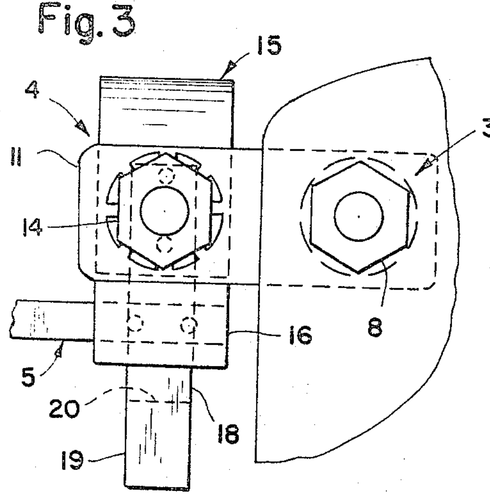
FIG. 3 is a side view of the structure shown in FIG. 2.
Figure 4:
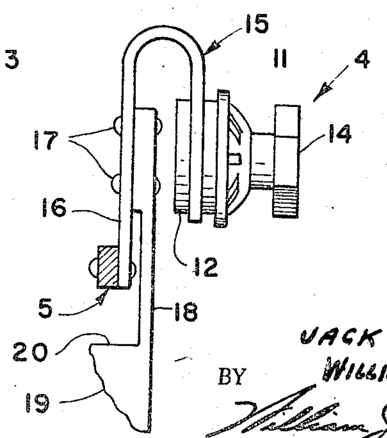
FIG. 4 is an end view of the structure shown in FIG. 3.

Referring more particularly to FIG. 1 of the drawing, numeral 1 denotes a safety cap and numeral 2 denotes a welding shield having a window 2*a*. The shield has holes in the sides of the top portion thereof through each of which is projected a bolt assembly 3 for providing an adjustable friction, pivotal fit and including a bolt head 8 and a friction washer 9 having flexible and radially outwardly curved strips which frictionally engage the outside surface of the shield 2 as the threaded shank of the bolt (not shown) is screw threaded into one of washers 7 between which is sandwiched an extension 11 of metal or other suitable material.

The other end of strip 11 is frictional and pivotally mounted on the downwardly extending extension of an inverted U-shaped clip 15 by a similar bolt assembly for providing a pivotal, adjustable friction fit, comprising a bolt head 14 integrally formed on a threaded shank (not shown) which projects and is screw threaded to one of a pair of washers 12 which sandwich said downward extension to an extent determined by the amount of flexing of friction washer 13 (similar to washer 9).

To the opposite downward extension of spring clip 15 there is attached by rivets or other suitable fastening means 17 a flexible hook of nylon or other flexible plastic material (or metal) comprising a shank portion 18 and a serrated curved portion 19 having a shelf 20 which is adapted to seat under the brim of a cap after the hook is first sprung outwardly from the brim by bending the narrow shank portion 18 by the thumbs of the wearer.

2

Each end of an adjustable head band 5 is attached to the lower extremity of hook 15 and is provided with adjustable means contained within sleeve 6 for adjusting the girth or circumference of head band 5 by having overlapping ends of band 5 which may be slidably pulled apart in sleeve 6 against the action of a spring.

In operation, therefore, when it is desired to adjustably move welding shield 2 vertically to line up the window 2*a* with the eyes or line of sight of the wearer, or perhaps to lower window 2*a* to line up with the eyes of the wearer as he looks angularly downwardly to his work, both nuts 14 and 8 are loosened to allow extension 11 to be selectively tilted angularly until the desired vertical adjustment and line of sight are obtained, after which both bolt heads are tightened manually by the wearer.

The presence of an extension 11 allows additional clearance between the face of the wearer and the shield. Slots (not shown) may be provided in extension 11 through which the shanks of both bolts 8 and 11 and inserted, to enable adjustment of said clearance. By making extensions 11 of different lengths for different conditions, the wearer may selectively use the extensions or omit them, as desired, for different uses.

An outstanding advantage of the mounting, including the extension 11, is that it is adaptable to conventional existing mountings, such as shown in the aforesaid patent, to enable conversion of these mountings to one which permits vertical adjustment as well as clearance for wearing a respirator.

Thus it will be seen that we have provided an efficient mounting for a welding shield to enable easy and quick attachment or detachment on a safety helmet and which not only provides an assured attachment, but which enables adjustment of the line of sight and particularly provides sufficient clearance between the face of the wearer and the shield to enable wearing of a respirator or other face protective device.

While we have illustrated and described a single specific embodiment of our invention, it will be understood that this is by way of illustration only, and that various changes and modifications may be made within the contemplation of our invention and within the scope of the following claim.

We claim:

In combination with a face-protecting shield, a safety cap having a band receiving portion and a brim portion, a mounting detachably connecting said shield to said safety cap, said mounting comprising an adjustable headband encircling a substantial part of said band receiving portion, inverted U-shaped clips having one leg attached to the ends of said headband, a manually adjustable bolt assembly, an extension in the form of a link pivotally attached to one end of said clip by means of said bolt assembly, adjusting means pivotally and frictionally attaching the other end of said links to the upper side portion of said shield, said adjusting means including a second manually adjustable bolt assembly and a friction washer, whereby said extension may be adjustably tilted to line up the window of the shield with the wearer's eyes, said extension being of a length to provide sufficient clearance ɪetween the face of the wearer and shield to enable wearɪng of a respirator underneath the shield.

References Cited

UNITED STATES PATENTS

| | | | |
|---|---|---|---|
| 2,153,714 | 4/1939 | Fleming et al. | 2—8 |
| 2,390,006 | 11/1945 | Severy | 2—8 |
| 2,729,820 | 1/1956 | Anderson | 2—8 |
| 2,736,027 | 2/1956 | Parmelee | 2—8 |
| 3,137,005 | 6/1964 | Herbine et al. | 2—8 X |

JORDAN FRANKLIN, *Primary Examiner.*

J. R. BOLER, *Assistant Examiner.*